Dec. 30, 1930.                M. VEDOVELLI                1,787,345
                        STEERING GEAR FOR VEHICLES
                        Original Filed Oct. 11, 1928
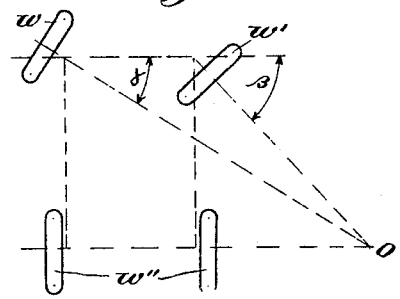
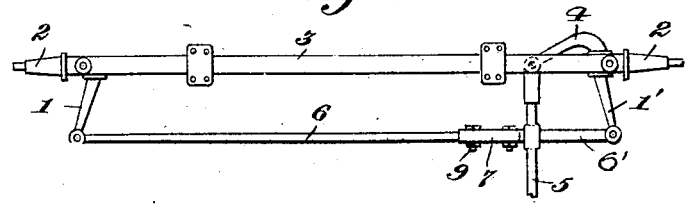
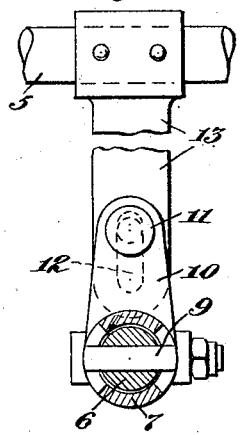 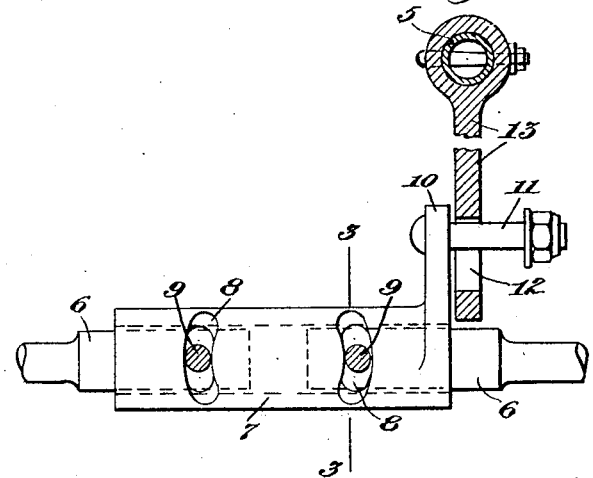
Inventor:
Mario Vedovelli,
by
Langner, Parry, Card & Langner
Att'ys.

Patented Dec. 30, 1930

1,787,345

UNITED STATES PATENT OFFICE

MARIO VEDOVELLI, OF MILAN, ITALY

STEERING GEAR FOR VEHICLES

Original application filed October 11, 1928, Serial No. 311,890, and in Italy October 27, 1927. Divided and this application filed September 23, 1929. Serial No. 395,954.

The present invention relates to vehicles having steering wheels and has for its object a steering device adapted to correct the deviations of said wheels at the time they are steered.

This application is a division of my application, Serial Number 311,890, filed October 11, 1928.

It is known that in order a turn may be described in a correct manner without slip by a vehicle, it is necessary that the axes of all the vehicle wheels intersect at a common point and therefore in the usual case of a vehicle having two steering front wheels it is necessary that the extensions of the axes of both front wheels intersect at a common point on the alignment of the common axis of the rear wheels.

In any case in a turn each steering wheel must steer through an angle different from the angle the other wheel or wheels is or are steered in order the turn may be made without slip.

The present invention has for its object a steering gear by which such a requirement is complied with by the fact that deviations through different angles are imparted to wheels by any given actuation of the steering gear.

In the annexed drawing are illustrated by way of example some embodiments of this invention and Figure 1 is the diagram of the position of the wheels of a four-wheel vehicle with two steering wheels at the time of steering;

Figure 2 is the plan view of a steering linkage according to the present invention;

Figure 3 is the front view to an enlarged scale with parts in section of the device used to alter the length of the rod connecting the steering wheel actuating arms in the construction of Figure 2;

Figure 4 is a side view of parts illustrated in Figure 3.

In Figure 1, $\alpha$ and $\beta$ shows angles different from each other through which the two steering wheels —$w$—$w'$— must deviate to correctly carry out a turn on a curve having its centre at O, —$w''$— being the rear wheels aligned on a common axis.

To comply with such a requirement in a construction of the kind of Figure 2 comprising an axle 3 having wheel supporting and steering spindles 2, different deviations must be imparted to the swivel spindles 2 and to their controlling arms 1—1'.

Assuming a conventional steering gear is used in which one of the spindles 2 carries an arm 4 connected with a controlling rod 5 actuated by a conventional steering gear and arms 1—1' are interconnected by a rod as 6—6', for the purpose above referred to it is necessary that the length of said rod 6—6' be reduced in a defined ratio with respect to the increase of the deviation imparted to arm 4 by rod 5 from the position corresponding with the straight running in which said wheels —$w$—$w'$— are parallel with each other. Said variation —$d$— is substantially given by the following formula in which —$l$— is the length of arm 1:

$$d = l\ (\text{sine } \beta - \text{sine } \alpha).$$

To secure such a result the present invention comprises a construction of steering linkage in which the arms 1—1' are connected by a two-section rod 6—6' the sections of said rod being interconnected by means causing the length of the entire rod 6—6' to be altered under the action of the means actuating the steering linkage.

In the embodiment shown in Figures 2, 3 and 4 the two rod sections 6—6' are engaged by cam means with a sleeve 7 embracing them and said sleeve 7 is rotated by the steering bar 5 at the time said bar 5 actuates arm 4 and the wheel carrying spindles 2—2 of the front axle 3 of the vehicle.

More particularly in said construction arms 1—1' are interconnected by two rod sections 6—6' and by sleeve 7 which embraces the adjacent ends of said sections 6—6' and has cam slots 8 engaged by pins 9 fastened on the adjacent rod sections. Sleeve 7 has an integrally formed arm 10 engaged by means of pin 11 and slot 12 by an arm 13 fastened on rod 5 which imparts the steering control to arm 4 of one of the wheel swivel spindles 2.

In this construction a longitudinal displacement of bar 5 produces a deviation of arm 4 and of the swivel spindle 2 rigid with it, and further it causes the sleeve 7 to rotate around its axis and therefore the operation of cam means 8—9 to cause sections 6—6 of the connecting rod to move into or out said sleeve 7 to alter the total length of the parts 6—7—6' this operation producing a deviation of arm 1' through an extent different from the angle through which arms 4 and 1 are moved.

Of course equivalent arrangements within the scope of the appended claims may be used, the form of the invention described herein being merely illustrative of one of the embodiments of the invention.

In any case the shape to be imparted to slots 8 of sleeve 7 may be easily traced by defining on the ground of the above formula, the value to be imparted to the actual or operative length of the connecting rod 6—6' in respect of values of wheel steering angles sufficiently close to each other.

What I claim as my invention and desire to secure by United States Letters Patent is:

1. In a vehicle a pair of steering wheel supporting parts, arms each solid with one of said parts, bar sections each having one end pivotally connected with the end of one of said arms, means interconnecting the other ends of said bar sections, said means comprising at least a cam guide transverse to the axis of said bar sections and guides for said bar sections extending in the direction of the axis of the same, and steering means actuating said arms and said interconnecting means for the same.

2. In a vehicle a pair of steering wheel supporting parts, arms each solid with one of said parts, bar sections each having one end pivotally connected with the end of one of said arms, a member slidably connecting the adjacent ends of said bar sections, cooperating cam means on said member and bar sections said cam means being symmetrical to each other with respect to the direction of the vehicle axis and transverse to the axis of said bar sections, and steering means actuating said arms and said parts interconnecting the same.

3. In a vehicle a pair of steering wheel supporting parts, arms solid with each of said parts, aligned bar sections each having one end pivotally connected with one of said arms, a sleeve slidably embracing the adjacent ends of said aligned bar sections, said sleeve having cam slots transverse to its axis and symmetrical to each other with respect to the direction of the vehicle axis, studs each solid with one of said bar sections and respectively engaging said slots and steering means actuating said arms and said sleeve.

4. In a vehicle a pair of steering wheel supporting parts, arms each solid with one of said parts, aligned bar sections each having one end pivotally connected with one of said arms, a sleeve slidably embracing the adjacent ends of said bar sections said sleeve having two symmetrical cam slots, two studs each engaged in one of said slots and fastened on the end of one of said bar sections embraced by said sleeve and steering means actuating one of said arms and said sleeve.

In testimony whereof I have signed my name to this specification.

MARIO VEDOVELLI.